(12) United States Patent
Latulipe et al.

(10) Patent No.: US 11,233,470 B2
(45) Date of Patent: Jan. 25, 2022

(54) SYNCHRONIZATION OF GENERATOR AND ELECTRIC MOTOR IN A HYBRID ELECTRIC AIRCRAFT PROPULSION SYSTEM

(71) Applicant: PRATT & WHITNEY CANADA CORP., Longueuil (CA)

(72) Inventors: Eric Latulipe, Ste-Julie (CA); Richard Freer, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 62 days.

(21) Appl. No.: 16/411,267

(22) Filed: May 14, 2019

(65) Prior Publication Data

US 2020/0079521 A1 Mar. 12, 2020

Related U.S. Application Data (60) Provisional application No. 62/731,384, filed on Sep. 14, 2018, provisional application No. 62/729,818, (Continued)

(51) Int. Cl.
*H02P 6/12* (2006.01)
*B64D 35/08* (2006.01)
(Continued)

(52) U.S. Cl.
CPC .............. *H02P 6/12* (2013.01); *B60L 50/13* (2019.02); *B60L 50/51* (2019.02); *B60L 50/60* (2019.02); *B60L 53/24* (2019.02); *B64D 27/02* (2013.01); *B64D 27/10* (2013.01); *B64D 27/12* (2013.01); *B64D 27/24* (2013.01); *B64D 27/26* (2013.01); *B64D 31/00* (2013.01); *B64D 31/06* (2013.01);
(Continued)

(58) Field of Classification Search
CPC .. H02P 6/12; H02P 6/005; B60L 50/13; B60L 50/60; B60L 53/24; B60L 50/51; B64D 35/08; H02K 19/34; H02K 47/04; H02K 16/04; H02K 41/03
See application file for complete search history.

(56) References Cited

U.S. PATENT DOCUMENTS

| 5,365,153 A | 11/1994 | Fujita et al. |
| 9,586,690 B2 * | 3/2017 | Rajashekara ............. F01D 7/02 |

(Continued)

FOREIGN PATENT DOCUMENTS

| CN | 105158627 A | 12/2015 |
| CN | 107910934 A | 4/2018 |

OTHER PUBLICATIONS

Extended European Search Report dated Jan. 2, 2020 in connection with EP application No. 19195955.0, 6 pages.
(Continued)

*Primary Examiner* — Viet P Nguyen
(74) *Attorney, Agent, or Firm* — Norton Rose Fulbright Canada LLP (57) ABSTRACT

There is described a method and system for operating a hybrid electric aircraft propulsion system. The method comprises modulating AC electric power applied to a first electric propulsor or a second electric propulsor from at least one motor inverter to synchronize the frequency of the first electric propulsor or the second electric propulsor with the frequency of a generator.

14 Claims, 9 Drawing Sheets

Related U.S. Application Data filed on Sep. 11, 2018, provisional application No. 62/727,683, filed on Sep. 6, 2018, provisional application No. 62/727,673, filed on Sep. 6, 2018, provisional application No. 62/727,681, filed on Sep. 6, 2018, provisional application No. 62/727,678, filed on Sep. 6, 2018.

(51) Int. Cl.

| | | |
|---|---|---|
| *H02K 47/04* | (2006.01) | |
| *B64D 27/02* | (2006.01) | |
| *B64D 27/10* | (2006.01) | |
| *B64D 27/24* | (2006.01) | |
| *B64D 31/06* | (2006.01) | |
| *F01D 15/10* | (2006.01) | |
| *F02K 3/06* | (2006.01) | |
| *H02P 5/74* | (2006.01) | |
| *H02P 9/00* | (2006.01) | |
| *B64D 27/26* | (2006.01) | |
| *B64D 31/00* | (2006.01) | |
| *H02K 51/00* | (2006.01) | |
| *H02P 17/00* | (2006.01) | |
| *B60L 50/13* | (2019.01) | |
| *B60L 50/60* | (2019.01) | |
| *B60L 53/24* | (2019.01) | |
| *B60L 50/51* | (2019.01) | |
| *B64D 27/12* | (2006.01) | |
| *H02K 19/34* | (2006.01) | |
| *H02P 6/00* | (2016.01) | |
| *B64D 35/02* | (2006.01) | |
| *G08C 19/38* | (2006.01) | |
| *H02K 41/03* | (2006.01) | |
| *B64D 35/00* | (2006.01) | |
| *H02P 101/25* | (2016.01) | |
| *H02P 101/30* | (2015.01) | |

(52) U.S. Cl.
CPC ............ *B64D 35/00* (2013.01); *B64D 35/02* (2013.01); *B64D 35/08* (2013.01); *F01D 15/10* (2013.01); *F02K 3/06* (2013.01); *G08C 19/38* (2013.01); *H02K 19/34* (2013.01); *H02K 41/03* (2013.01); *H02K 47/04* (2013.01); *H02K 51/00* (2013.01); *H02P 5/74* (2013.01); *H02P 6/005* (2013.01); *H02P 9/008* (2013.01); *H02P 17/00* (2013.01); *B60L 2200/10* (2013.01); *B60L 2210/42* (2013.01); *B60L 2220/20* (2013.01); *B64D 2027/026* (2013.01); *F05D 2220/323* (2013.01); *F05D 2220/764* (2013.01); *H02K 2213/06* (2013.01); *H02P 2101/25* (2015.01); *H02P 2101/30* (2015.01)

(56) References Cited

U.S. PATENT DOCUMENTS

| | | |
|---|---|---|
| 9,764,848 B1 | 9/2017 | Vondrell et al. |
| 9,882,513 B2 | 1/2018 | Armstrong et al. |
| 9,937,803 B2 | 4/2018 | Siegel et al. |
| 10,017,266 B2 | 7/2018 | Phan et al. |
| 10,526,085 B2 | 1/2020 | Fenny |
| 10,814,991 B2 | 10/2020 | Shah et al. |
| 2007/0018035 A1 | 1/2007 | Saiz et al. |
| 2013/0062455 A1 | 3/2013 | Lugg et al. |
| 2013/0147204 A1 | 6/2013 | Botti et al. |
| 2016/0340051 A1 | 11/2016 | Edwards et al. |
| 2016/0365810 A1* | 12/2016 | Armstrong ............... H02P 5/74 |
| 2017/0129617 A1 | 5/2017 | Shah et al. |
| 2017/0166316 A1 | 6/2017 | Zhou et al. |
| 2017/0190434 A1 | 7/2017 | Dong et al. |
| 2017/0203839 A1 | 7/2017 | Giannini et al. |
| 2017/0270513 A1 | 9/2017 | Armstrong et al. |
| 2017/0275009 A1 | 9/2017 | Huang |
| 2017/0320585 A1 | 11/2017 | Armstrong et al. |
| 2017/0349293 A1 | 12/2017 | Klemen et al. |
| 2017/0369179 A1 | 12/2017 | Bradbrook |
| 2018/0050807 A1 | 2/2018 | Kupiszewski et al. |
| 2018/0079515 A1 | 3/2018 | Harwood et al. |
| 2018/0118356 A1 | 5/2018 | Armstrong et al. |
| 2018/0127089 A1 | 5/2018 | Welstead et al. |
| 2018/0170190 A1 | 6/2018 | Siegel et al. |
| 2018/0178920 A1 | 6/2018 | Swann et al. |
| 2018/0230845 A1 | 8/2018 | Joshi et al. |
| 2018/0251226 A1 | 9/2018 | Fenny et al. |
| 2018/0257787 A1 | 9/2018 | Hamel et al. |

OTHER PUBLICATIONS

Extended European Search Report dated Jan. 22, 2020 in connection with EP application No. 19195959.2, 6 pages.
Extended European Search Report dated Jan. 22, 2020 in connection with EP application No. 19196046.7, 6 pages.
Extended European Search Report dated Jan. 22, 2020 in connection with EP application No. 19196042.6, 6 pages.
Extended European Search Report dated Jan. 22, 2020 in connection with EP application No. 19195970.9, 6 pages.
Extended European Search Report dated Jan. 23, 2020 in connection with EP application No. 19196057.4, 6 pages.
Office Action dated Mar. 16, 2021 in counterpart EP application No. 19195955.0.
Pornet, Clement, "Electric Drives for Propulsion System of Transport Aircraft", New Applications of Electric Drives, Dec. 9, 2015, In Tech.

* cited by examiner

SYNCHRONIZATION OF GENERATOR AND ELECTRIC MOTOR IN A HYBRID ELECTRIC AIRCRAFT PROPULSION SYSTEM

CROSS-REFERENCE TO RELATED APPLICATIONS

The present application claims the benefit of U.S. Provisional Patent Application No. 62/727,673 filed on Sep. 6, 2018, U.S. Provisional Patent Application No. 62/727,678 filed on Sep. 6, 2018, U.S. Provisional Patent Application No. 62/727,681 filed on Sep. 6, 2018, U.S. Provisional Patent Application No. 62/727,683 filed on Sep. 6, 2018, U.S. Provisional Patent Application No. 62/729,818 filed on Sep. 11, 2018 and U.S. Provisional Patent Application No. 62/731,384 filed on Sep. 14, 2018, the contents of which are hereby incorporated by reference in their entirety.

TECHNICAL FIELD

The present disclosure relates generally to aircraft propulsion systems that use power from both an internal combustion engine and an electric motor.

BACKGROUND OF THE ART

Hybrid electric aircraft propulsion systems combine internal combustion and electric propulsion technologies. In an electric propulsion system, electrical energy is converted to rotational energy by an electric motor to drive a propulsion fan or a propeller.

There are environmental and cost benefits to having at least a portion of the power for an aircraft propulsion system come from electric motors. Therefore, there is a need for improvement to existing architectures.

SUMMARY

In accordance with a broad aspect, there is provided a method for operating a hybrid electric aircraft propulsion system. The method comprises providing a first electric propulsor and a second electric propulsor with a first source of propulsion power from a generator configured for generating a first output of alternating current (AC) electric power, providing the first electric propulsor and the second electric propulsor with a second source of propulsion power from at least one motor inverter operatively coupled to a direct current (DC) power source, the at least one motor inverter configured to convert the DC electric power from the DC power source into a second output of AC electric power, and modulating the second source of AC electric power applied to the first electric propulsor or the second electric propulsor from the at least one motor inverter to synchronize the frequency of the first electric propulsor or the second electric propulsor with the frequency of the generator.

In accordance with another broad aspect, there is provided a system for operating a hybrid electric aircraft propulsion system. The system comprises a processing unit and a computer readable medium having stored thereon program instructions executable by a processor for synchronizing an electric motor and a generator in a hybrid electric aircraft propulsion system. The program instructions are executable for providing a first electric propulsor and a second electric propulsor with a first source of propulsion power from a generator configured for generating a first output of alternating current (AC) electric power, providing the first electric propulsor and the second electric propulsor with a second source of propulsion power from at least one motor inverter operatively coupled to a direct current (DC) power source, the at least one motor inverter configured to convert the DC electric power from the DC power source into a second output of AC electric power, and modulating the second source of AC electric power applied to the first electric propulsor or the second electric propulsor from the at least one motor inverter to synchronize the frequency of the first electric propulsor or the second electric propulsor with the frequency of the generator.

In accordance with yet another broad aspect, there is provided a hybrid electric aircraft propulsion system. The system comprises a thermal engine configured for outputting rotational mechanical power, a generator configured for generating a first source of alternating current (AC) electric power from the rotational mechanical power, at least one motor inverter configured to convert DC electric power received from a DC power source to AC electric power to provide a second source of AC electric power, a first electric propulsor and a second electric propulsor operatively coupled to the generator to receive AC electric power therefrom and operatively coupled to the at least one motor inverter to receive AC electric power therefrom, and a controller configured for modulating the AC electric power applied to the first electric propulsor or the second electric propulsor from the at least one motor inverter to synchronize a frequency of the first electric propulsor or the second electric propulsor with a frequency of the generator.

Features of the systems, devices, and methods described herein may be used in various combinations, in accordance with the embodiments described herein.

BRIEF DESCRIPTION OF THE DRAWINGS

Reference is now made to the accompanying figures in which.

DETAILED DESCRIPTION

Figure 1:
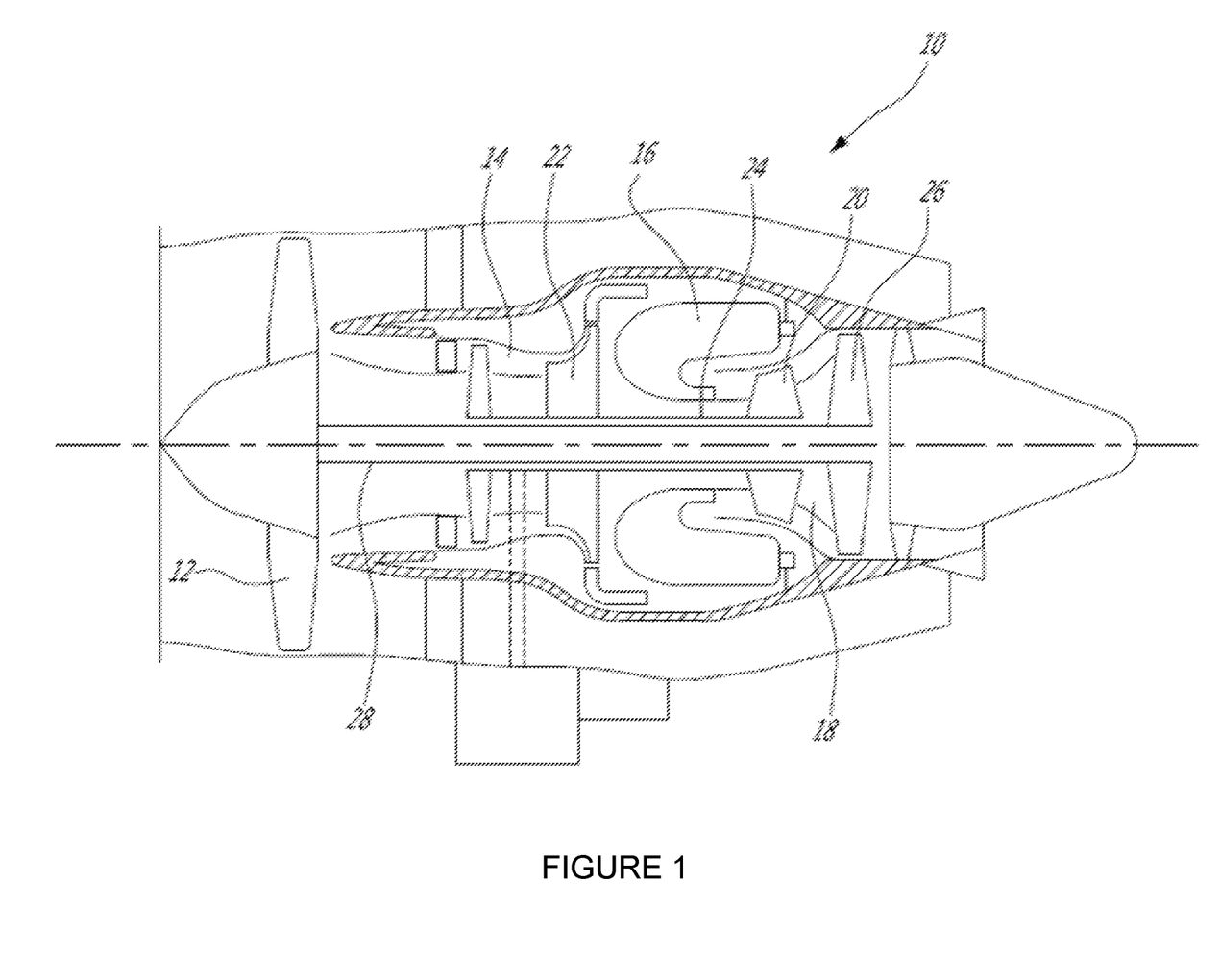
FIG. 1 is a schematic cross-sectional view of a gas turbine engine, in accordance with an illustrative embodiment.

There is described herein a hybrid electric aircraft propulsion system and method. The aircraft propulsion system uses power generated by a thermal engine and power generated by an electric generator. FIG. 1 illustrates an example thermal engine of a type preferably provided for use in subsonic flight, namely a gas turbine engine 10. The gas turbine engine 10 generally comprises in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section. A turboprop engine may also apply. In some embodiments, the thermal engine may be of a type other than a combustion engine, such as a piston engine or a rotary engine. In addition, although the engine 10 is described herein for flight applications, it should be understood that other uses, such as industrial or the like, may apply. Note that a constant volume combustion thermal machine, other than a piston or a rotary engine, may also be used.

Figure 2:
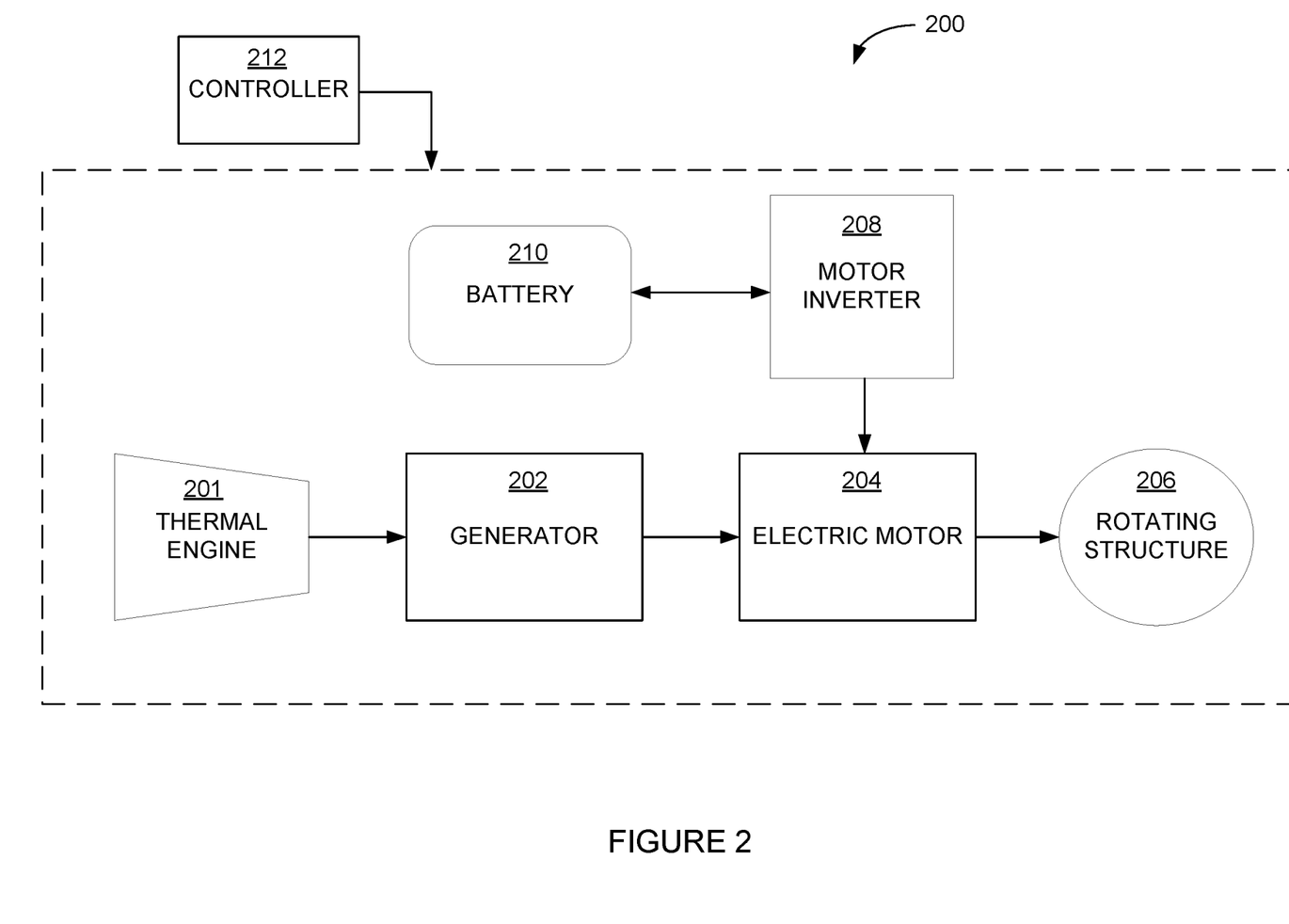
FIG. 2 is a block diagram of a hybrid electric aircraft propulsion system, in accordance with an illustrative embodiment.

Referring now to FIG. 2, there is illustrated an example embodiment for a hybrid electric aircraft propulsion system 200. The system 200 presents an AC-AC architecture, whereby alternating current (AC) electric power is generated and applied directly to an electric motor. In an AC-DC-AC architecture, the AC electric power is converted to direct current (DC) and then reconverted to AC electric power to drive the electric motor. The AC-AC architecture is more efficient than the AC-DC-AC architecture as there are losses incurred during the conversion stages from AC to DC and from DC to AC.

Thermal engine 201 is operatively coupled to a generator 202. The generator 202 receives motive power (or mechanical energy) from the thermal engine 201 and converts the motive power into electrical power. The generator 202 outputs alternating current (AC) electric power. The AC electric power is then provided directly to an electric motor 204. The electric motor 204 converts the AC electric power into mechanical energy in the form of a rotary force. The rotary force is applied to a rotating structure 206 (i.e. a rotating propulsor), such as a propeller or a propulsion fan of an aircraft. The electric motor 204 and rotating structure 206 together form an electric propulsor.

The electric motor 204 also receives AC electric power from a motor inverter 208. The motor inverter 208 is operatively coupled to a battery 210 (or the aircraft electrical system). The battery 210 may be a dedicated battery provided for the hybrid electric aircraft propulsion system 200. Alternatively, the electric power supplied to the inverter 208 may come from: an auxiliary power unit, a supplementary power unit, a backup power generator system, or the aircraft electrical system that does not include batteries or capacitors. The motor inverter 208 may thus be connected to the battery 210 via a battery bus on the aircraft, or via dedicated wiring and/or connectors. Any type of device containing one or more cells that convert chemical energy directly into electrical energy may be used as the battery 210. In some embodiments, the battery 210 is based on a non-chemical principal, such as using the electricity of a supercapacitor in an energy storage mode.

The motor inverter 208 receives direct current (DC) electric power from the battery 210 (or another direct current source) and converts the DC voltage to AC voltage whose frequency and phase is adjusted to enable the motor 204 to generate mechanical power. The motor inverter 208 can also be used in the opposite sense to charge the battery 210 when the electric motor 204 is being driven by external machine forces, making it behave as a generator, in which condition the inverter can convert AC voltage back into DC voltage. In some embodiments, the motor inverter 208 may also be used in a reverse mode, whereby AC electric power is converted to DC electric power.

The electric motor 204 therefore has a first input operatively coupled to the generator 202 to receive a first source of AC electric power. The electric motor 204 also has a second input operatively coupled to the motor inverter 208 to receive a second source of AC electric power. Note that the electric motor 204 does not need to have two independent inputs (i.e. one from the generator 202 and one from the inverter 208). The output of the generator 202 and the output of the inverter 208 may be combined or connected in parallel before a motor input interface. The electric motor 204 will, in response to receiving either one of the first source of AC electric power and the second source of AC electric power (or both simultaneously), generate a rotating output for driving the rotating structure 206.

A controller 212 is configured for selectively driving the electric motor 204 using the first source of AC electric power from the generator 202, the second source of AC electric power from the motor inverter 208, or a combination thereof. When AC electric power is received concurrently from both the generator 202 and the motor inverter 208, a greater amount of power is available to the electric motor 204. This in turn allows for a greater rotary force to be applied to the rotating structure 206.

In some embodiments, the first source of AC electric power provided by the generator 202 is the primary source of propulsion power for the electric motor 204. For example, under low power operating conditions, such as in cruise mode, all propulsive power for the rotating structure 206 may be provided by the generator 202. Under high power operating conditions, such as in climb mode or take-off mode, a boost of propulsion power may be provided by the battery 210 through the motor inverter 208. A secondary or additional source of electric power is thus available for the electric motor 204 through the motor inverter 208 in order to supplement the electric power provided by the generator 202.

In some embodiments, the motor inverter 208 is sized to match the secondary power requirements of the electric motor 204, i.e. the motor inverter 208 does not need to be a full-size motor inverter in order to drive the electric motor 204 on its own. In addition, there is no need for a generator converter to convert the voltage from AC to DC, since the electric power generated by the generator 202 is fed to the electric motor 204 without conversion. This architecture thus avoids the need for two stages of conversion during low power operating conditions. In some embodiments, the battery 210 is recharged directly from the motor inverter 208.

In some embodiments, the motor inverter 208 is used to recover from or prevent desynchronization of the generator 202 and the electric motor 204. When used for recovery of desynchronization, the motor inverter 208 may synchronize the frequency of the electric motor 204 to the frequency of the generator 202, in response to a command or control signal received from the controller 212, or in response to logic implemented in the inverter 208 which monitors and seeks to control the frequency and phasing of the generator 202 and motor 204. During synchronization, the controller 212 may temporarily disconnect the generator 202 from the electric motor 204, for example by opening a relay therebetween. The motor inverter 208 may then adjust the power to the electric motor 204 so that the speed of the electric motor 204 is modified in such a way to match the frequency of the electric motor 204 to the frequency of the generator 202. The electric motor 204 and the generator 202 can then be brought back in phase with each other. Once the electric motor 204 is back in phase with the generator 202, the connection between the generator 202 and the electric motor 204 is restored.

When used for prevention of desynchronization, the motor inverter 208 may actively monitor the phase of the electric motor 204. Upon detection of a mismatch in phase between the generator 202 and the electric motor 204, for example in the case where the motor is slowed down by external forces, the motor inverter 208 may send an electric signal that is in-phase with the electric motor 204, to provide additional power to bring the electric motor 204 back in phase with the generator 202. This feature may be put into effect by the controller 212 or it can be incorporated in the inverter 208.

In some embodiments, the motor inverter 208 is used to recharge the battery 210 or provide additional electrical power to the aircraft electrical systems that are connected to the inverter 208. For example, the motor inverter 208 can increase the power demand on the generator 202, such that the power produced by the generator exceeds the power required by the rotating structure 206 or load, and feed the excess power back to the battery 210 or aircraft electrical system. Alternatively, the motor inverter 208 can increase the power going to the electric motor 204 by feeding energy from the battery 210 to the electric motor 204. This in turn increases the power available to the rotating structure 206. The motor inverter 208 can either increase the available torque to the rotating structure 206 (ex: for a variable pitch propeller, additional torque may be required depending on the selected pitch of the propeller), or it can act as a generator to extract energy from a windmilling propeller by converting the AC voltage to a DC voltage that is higher than DC bus voltage in order to recharge the battery or feed electrical power back to the aircraft electrical system, if so desired. The inverter 208 has the ability to control the voltage on the DC bus, thereby controlling the power going to the DC bus.

Figure 3:
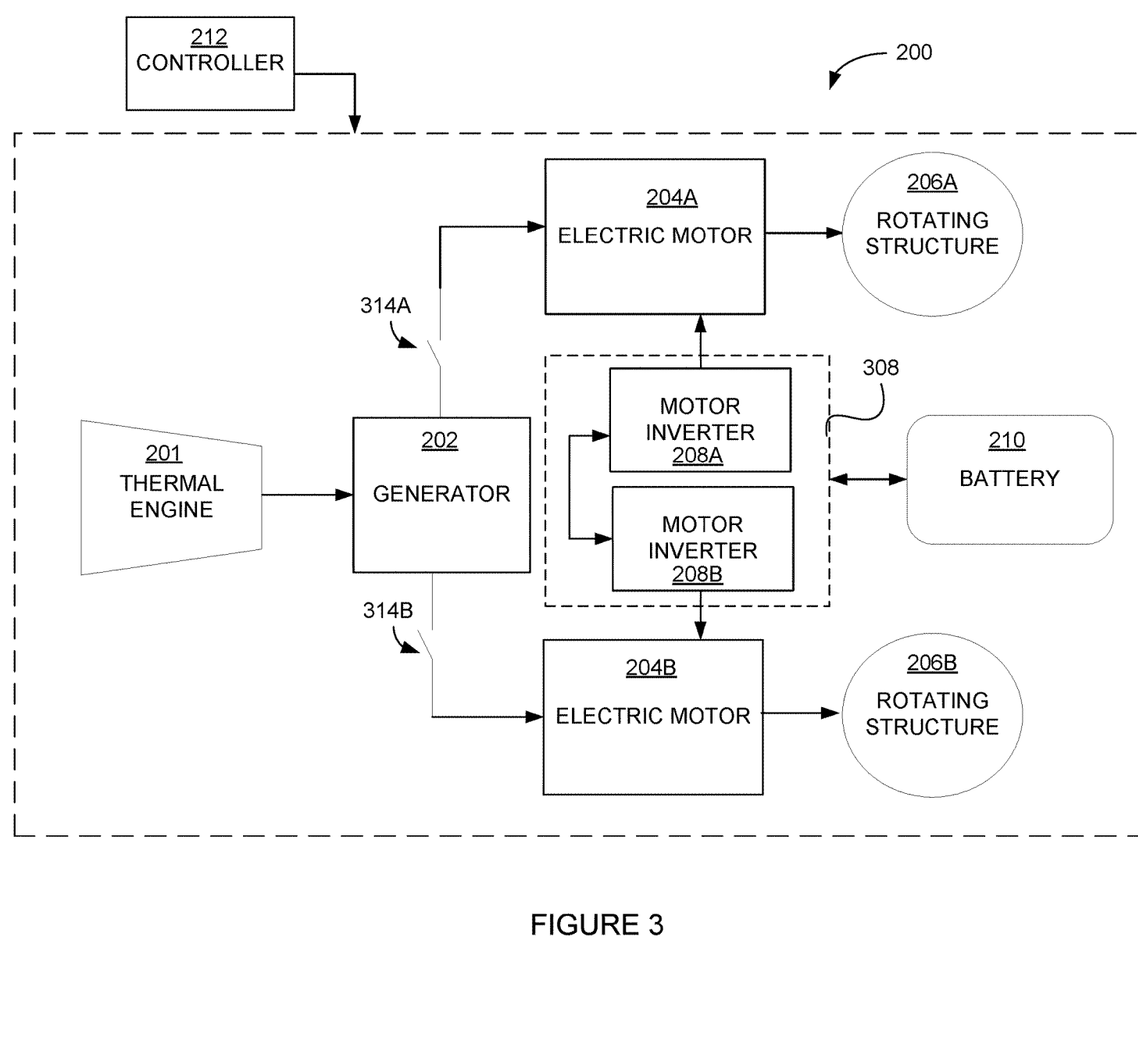
FIG. 3 is a block diagram of a hybrid electric aircraft propulsion system having two electric motors, in accordance with an illustrative embodiment.

Referring to FIG. 3, there is illustrated another example embodiment for a hybrid electric aircraft propulsion system 200. In this example, two electric motors 204a, 204b are driven by the generator 202. Each electric motor 204a, 204b, is associated with its own rotating structure 206a, 206b, respectively. Two motor inverters 208a, 208b are also provided, one to feed each one of the electric motors 204a, 204b, respectively. It should be understood that a single motor inverter 308 may also be used instead of two separate motor inverters 208a, 208b. The motor inverter 308 would then be sized for the power requirements of two electric motors 204a, 204b instead of just one of the electric motors 204a, 204b. In addition, the motor inverter 308 may be disconnected from electric motor 204a in order to perform a synchronization of electric motor 204b, and disconnected from electric motor 204b in order to perform a synchronization of electric motor 204a.

In some embodiments, the two motor inverters 208a, 208b are interconnected, in case of a failure of one of the two motor inverters 208a, 208b. For example, if one motor inverter 208a fails, the other motor inverter 208b may be used to charge the battery 210 or to drive the electric motor 204a associated with the failed motor inverter 208a. This may also be achieved using a series of connections between the electric motors 204a, 204b and the motor inverters 208a, 208b to allow for selective connection and disconnection of the electric motors 204a, 204b to the motor inverters 208a, 208b.

In some embodiments, one or more relays 314a, 314b are provided in the interconnection path between the generator 202 and each one of the electric motors 204a, 204b, respectively. The relays 314a, 314b are an example embodiment for allowing selective connection and disconnection of the generator 202 to either one of the electric motors 204a, 204b. Other means of connection/disconnection may also be used.

The electric motors 204a, 204b may be provided on separate wings of an aircraft. Alternatively, they may be provided on a same wing of an aircraft. Also alternatively, one or both of the electric motors 204a, 204b may be provided in the nacelle or hub of a rotating propulsion device such as a propeller, fan, lift rotor or thruster, or in the hub of a contra-rotating propeller, fan rotor or thruster.

Three or more electric motors may be provided, whereby each electric motor 204 is associated with a motor inverter 208. Alternatively, two or more motor inverters 208 may be combined to form a larger motor inverter 308 for all of the electric motors 204 or a subset thereof.

Figure 4:
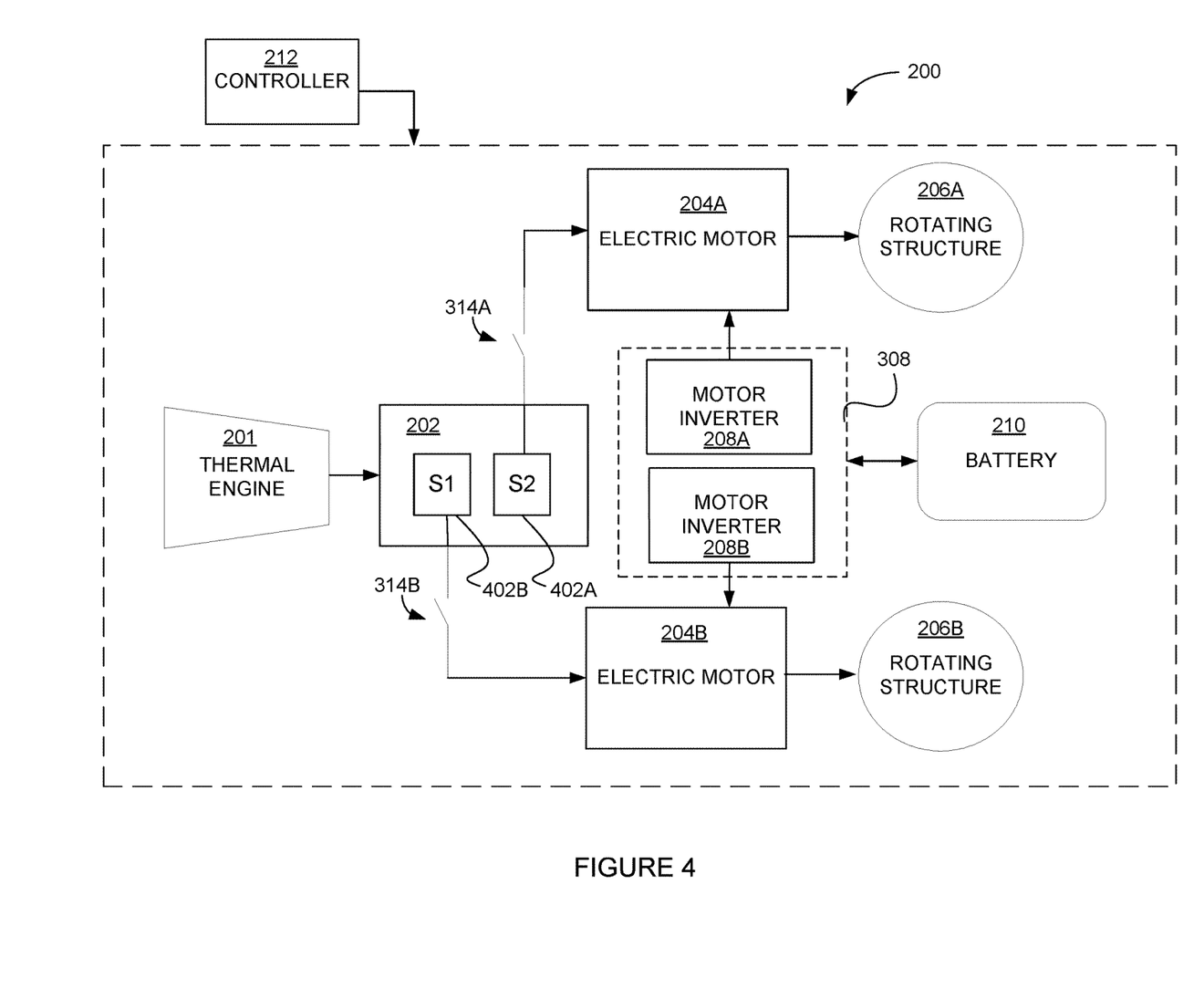
FIG. 4 is a block diagram of a block diagram of a hybrid electric aircraft propulsion system having a dual stator generator, in accordance with an illustrative embodiment.

FIG. 4 illustrates yet another embodiment of the hybrid electric aircraft propulsion system 200. In this example, the generator 202 is a dual stator generator, having a first generator stator 402a driving one electric motor 204a and a second generator stator 402b driving the other electric motor 204b. Note that this embodiment could also be applied to three or more sets of generator stators, motors and inverters. Two or more of the inverters 208 may be combined to form a larger motor inverter 308 for all the electric motors 204 or a subset thereof. In some embodiments, motor inverters 208a, 208b comprise a converter to perform the conversion from AC to DC to recharge the battery 210. The electric motors 204a, 204b are driven independently from each other. Relays 314a, 314b may or may not be present in this embodiment, so as to allow a selective connection/disconnection of the generator 202 and the electric motors 204a, 204b.

Figure 5:
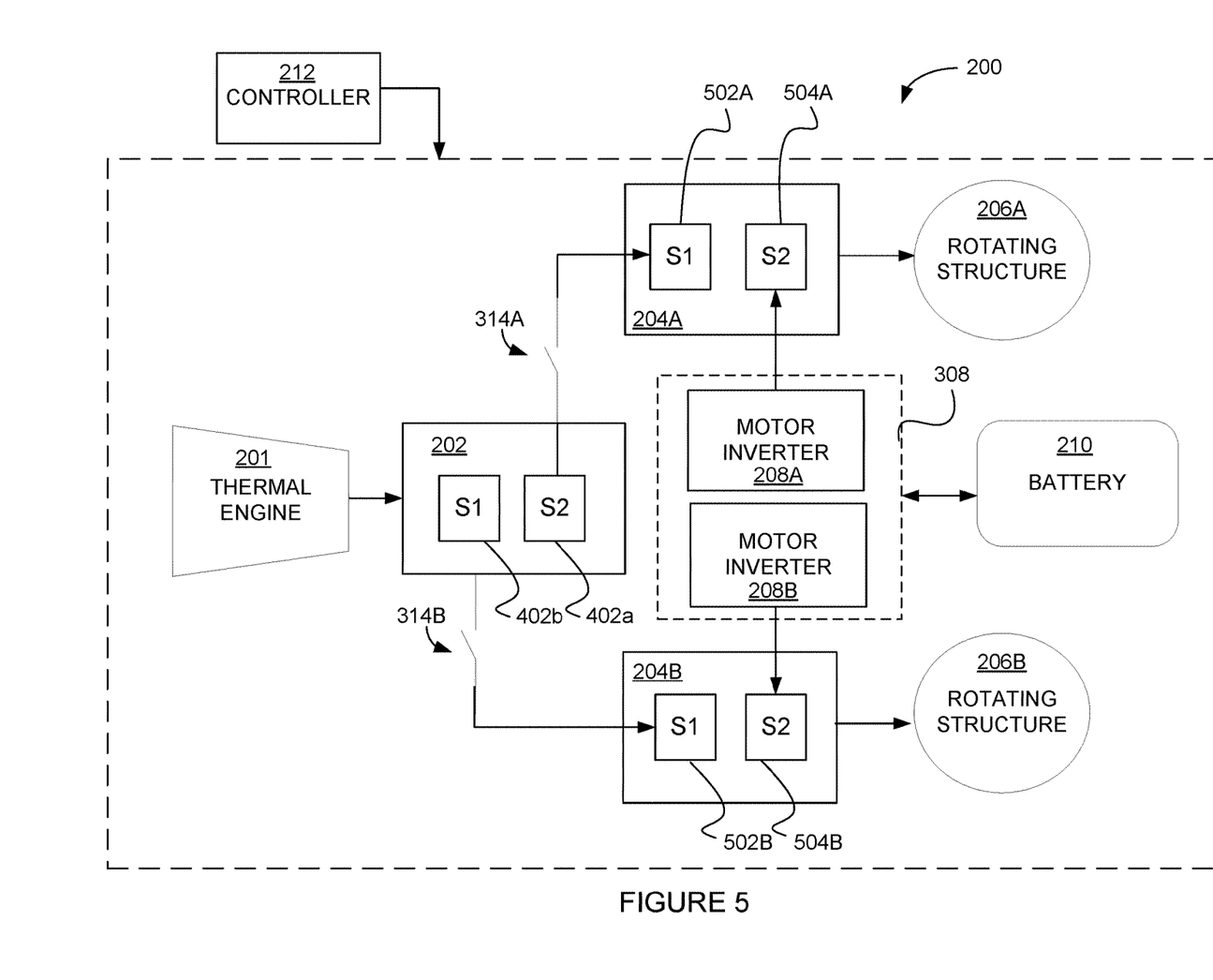
FIG. 5 is a block diagram of a hybrid electric aircraft propulsion system having dual stator electric motors, in accordance with an illustrative embodiment.

FIG. 5 illustrates another example embodiment of the hybrid electric aircraft propulsion system 200. In this example, one or more of the electric motors 204a, 204b have dual stators. The example illustrated shows electric motor 204a having a first motor stator 502a and a second motor stator 504a, and electric motor 204b having a first motor stator 502b, and a second motor stator 504b. Motor stator 502a is operatively coupled to generator stator 402a, and motor stator 502b is operatively coupled to generator stator 402b. Motor stator 504a is operatively coupled to motor inverter 208a, and motor stator 504b is operatively coupled to motor inverter 208b. In this configuration, the generator 202 does not share the same motor stator as the motor inverters 208a, 208b, thus resulting in the generator power and the motor inverter power being independent from one another. Should the motor inverter 208a be used to recharge the battery 210, stator 504b would act as a motor while stator 504a would act as a generator from which a conversion from AC to DC is required to recharge the battery 210. Should the motor inverter 208b be used to recharge the battery 210, stator 504a would act as a motor while stator 504b would act as a generator from which a conversion from AC to DC is required to recharge the battery 210.

Figure 6:
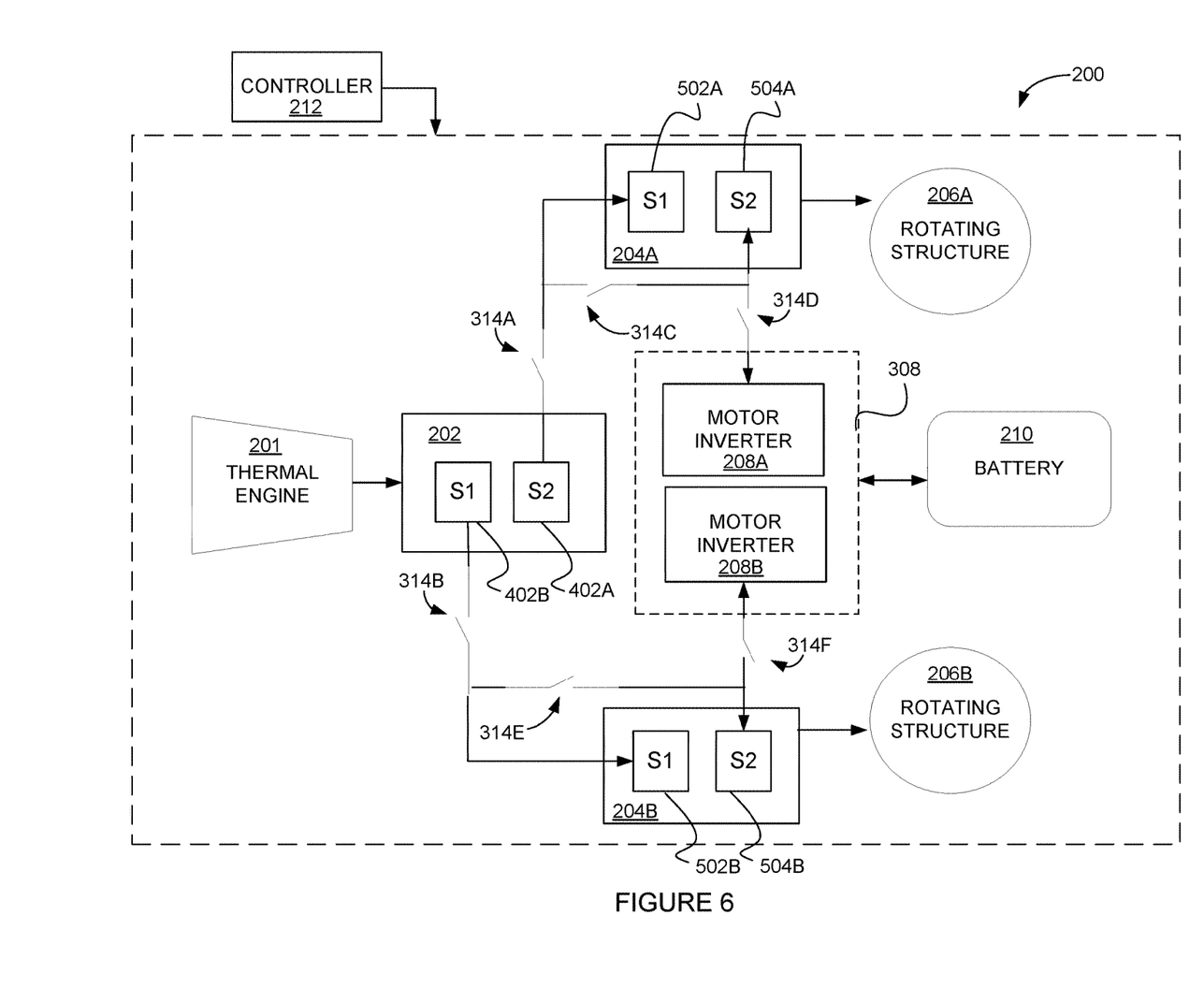
FIG. 6 is a block diagram of a hybrid electric aircraft propulsion system having selective connectivity, in accordance with an illustrative embodiment.

Referring to FIG. 6, there is illustrated another embodiment of the hybrid electric aircraft propulsion system 200. In this example, additional connections are provided between the generator 202, the electric motors 204a, 204b, and the motor inverters 208a, 208b. Generator stator 402a may be selectively connected to both stators 502a, 504a of the electric motor 204a by closing relays 314a and 314c and opening relay 314d. Generator stator 402b may be selectively connected to both stators 502b, 504b of the electric motor 204b by closing relays 314b and 314e and opening relay 314f. Motor inverter 208a may be selectively connected to both stators 502a, 502b of the electric motor 204a by closing relays 314d and 314c and opening relay 314a. Motor inverter 208b may be selectively connected to both stators 502b, 504b of the electric motor 204b by closing relays 314f and 314e and opening relay 314b. Also, each stator 502a and/or 502b can be connected to both the generator stator 402a and the inverter 208A simultaneously, without opening relay 314a if so desired. This is useful to be able to use the inverters to either provide additional power or extract power to recharge batteries, or provide power to the aircraft DC bus, or to adjust and to maintain the motor and generator in phase with each other. Likewise for the other motor and associated generator stator, inverters, relays etc. This architecture provides the ability for the generator 202 to drive both stators 502a, 504a or 502b, 504b of either electric motor 204a, 204b, and for the motor inverters 208a, 208b, to drive both stators 502a, 504a or 502b, 504b of either electric motor 204a, 204b.

The architecture of FIG. 6 also provides the ability to recharge the battery 210 directly from the generator 202 by closing relays 314a, 314c, 314d and/or 314b, 314e, 314f, thereby providing a direct path between the generator 202 and the motor inverters 208a, 208b, respectively. In such a case, one or both of motor inverters 208a, 208b would need to be provided with an AC-DC converter to transform the AC power received by the generator 202 into DC power for the battery 210. The architecture of FIG. 6 also provides the ability for the battery to be used to provide mechanical power to the thermal engine, by driving the stator 402a or 402b as an electric motor instead of as a generator, if so desired, for example if this is useful to start the thermal engine or drive auxiliary systems such as pumps that are connected to the generator shaft before the engine is started. The same could be said of other embodiments.

Figure 7:
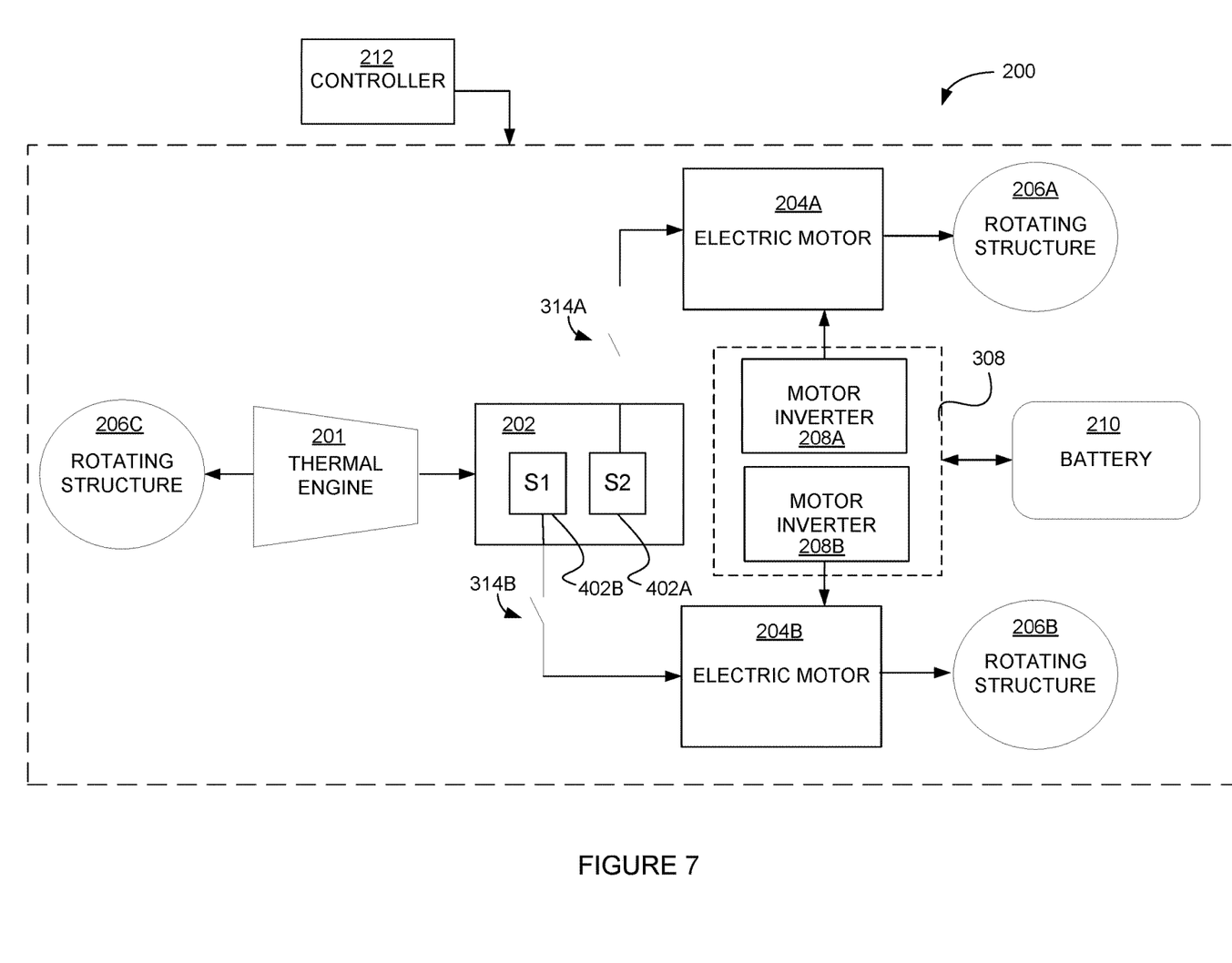
FIG. 7 is a block diagram of a hybrid electric aircraft propulsion system having additional propulsive power, in accordance with an illustrative embodiment.

Turning to FIG. 7, there is illustrated yet another embodiment of the hybrid electric aircraft propulsion system 200. In this example, a rotating structure 206c is operatively coupled to the thermal engine 201 so as to provide additional propulsion to the aircraft. Indeed, the motive power generated by the thermal engine 201 may also be applied directly to a rotating structure 206c such as a propeller or propulsion fan of the aircraft in order to supplement propulsion provided by rotating structures 206a, 206b.

It should be noted that while rotating structure 206c is illustrated in combination with the embodiment of FIG. 4, it may also be added to any of the other embodiments provided in FIGS. 2, 3, 5 and 6, as well as variants thereof. Variants thereof include, for example, a three-stator generator connected to three electric motors. It will be understood that the present embodiments apply to any number of generator stators and motor stators. Another example of a variant to the present embodiments is a three stator electric motor, each stator connected to one of a generator stator, a first motor inverter, and a second motor inverter. The first and second motor inverters can be connected to a same battery or to separate batteries. Other variants will be readily understood by those skilled in the art.

In some embodiments, the various architectures for the hybrid electric aircraft propulsion system 200 are used to address possible failures within the system 200. Various examples of failure modes are described below.

Based on the embodiments of FIGS. 2 to 7, propulsion power for the rotating structure(s) 206 are available via the battery 210 in case of a failure of the thermal engine 201. The available power is however limited by the power & energy capacity of the battery 210 (or aircraft DC bus) and the power rating of the motor inverter(s) 208, 208a, 208b, 308. Similarly, in the case of a generator failure due to a short circuit, propulsion power for the rotating structure(s) 206, 206a, 206b is available via the battery 210, but limited by the capacity of the battery 210 and the power rating of the motor inverter(s) 208, 208a, 208b, 308. In the case of a battery failure, propulsion power is available but limited by the power of the generator 202 and the available fuel for the thermal engine 201.

Based on the embodiments of FIGS. 3 to 7 where there are at least two electric motors 204a, 204b, in the case of a failure to one electric motor 204a, full power is available to the other functional electric motor 204b. In the case of a failure to one motor inverter 208a, full power is available to one electric motor 204b and partial power is available to the other electric motor 204a, limited by the power of the generator 202 and the available fuel for the thermal engine 201. If the two motor inverters 208a, 208b are connected together, then full power may be available to either electric motor 204a, 204b.

Based on the embodiments of FIGS. 4 to 7 where the generator 202 has dual stators 402, 404, in the case of a generator failure due to an open-circuit on one of the two stators 402, 404, full power is available to one of the two electric motors 204a, 204b. Partial power is available to the other one of the two electric motors 204a, 204b, limited by the power and capacity of the battery 210 and the power rating of the motor inverter 208a, 208b associated thereto. In addition, in case of battery depletion, energy from the functioning generator stator can be transferred to the opposite motor through the two motor inverters.

Based on the embodiment of FIG. 5 where each electric motor 204a, 204b has two stators, in the case of a failure to one stator 502a or 504a, some power is still available from the electric motor 204a. If the failure is to stator 502a, power is still available from the battery 210 and is limited by the capacity of the battery 210 and the power rating of the motor inverter 208a associated thereto and the power rating of the remaining motor stator 504a. If the failure is to stator 504a, power is still available from the generator 202 and is limited by the power of the generator 202 and the available fuel for the thermal engine 201 and the power rating of the remaining motor stator 502a.

Based on the embodiment of FIG. 6, if an inverter 208a or 208b fails, full power is still available for the associated electric motor 204a or 204b from the generator stator 402a or 402b with proper relay configuration, limited by generator rating. Similarly, if a generator stator 402a or 402b fails, both motor stators of the associated electric motor 204a or 204b may be powered by the battery 210. The total power available would then depend on the rating of the inverter 208a or 208b and of the battery 210.

Based on the embodiment of FIG. 7, if both electric motors 204a, 204b fail and the aircraft is out of fuel, power from the battery can be transferred to the main shaft of the thermal engine 201 to produce propulsion power for the rotating structure 206c. The motor inverters 208a, 208b may be connected to the generator 202 to act as a motor and add power to the rotating structure 206C and other devices such as pumps that might also be mechanically connected to the rotating structure. If all electric systems fail, the thermal engine 201 can still provide propulsion power for the rotating structure 206c.

Figure 8:
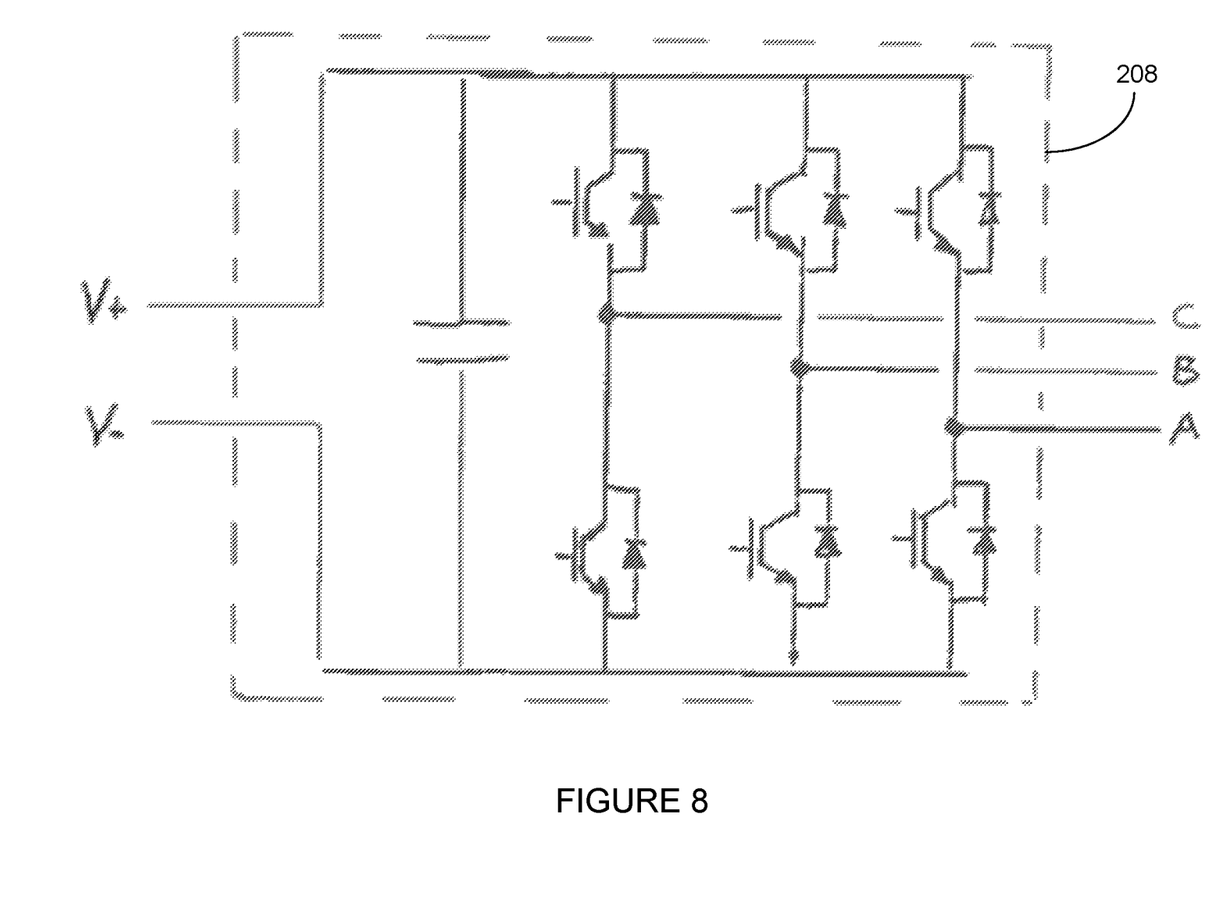
FIG. 8 is an example of a motor inverter, in accordance with an illustrative embodiment.

FIG. 8 is an example embodiment of a motor inverter 208. There is illustrated one of many possible embodiments that can be used with the hybrid electric aircraft propulsion system 200 described herein. Lines V+ and V− are connected to the positive and negative terminals of the battery 210. Lines A, B, C are connected to an electric motor 204, and represent the three phases of the AC electric power provided thereto.

Figure 9:
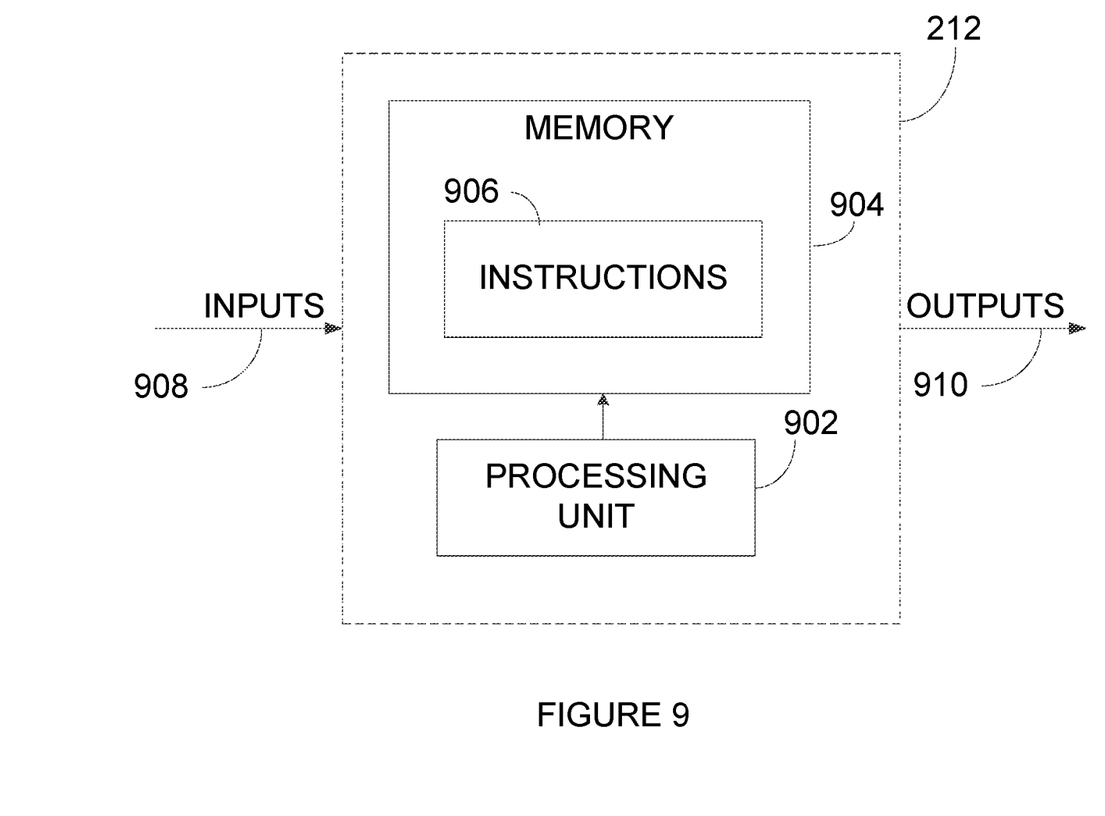
FIG. 9 is a block diagram of an example controller, in accordance with an illustrative embodiment; and It will be noted that throughout the appended drawings, like features are identified by like reference numerals.

With reference to FIG. 9, there is illustrated an example embodiment of controller 212, comprising a processing unit 902 and a memory 904 which has stored therein computer-executable instructions 906. FIG. 9 may also represent a control function embedded in the inverter 208. The processing unit 902 may comprise any suitable devices configured to implement the system such that instructions 906, when executed by the controller 212 or other programmable apparatus, may cause the functions/acts/steps as described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to the controller 212, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902. Note that the controller 212 can be implemented as part of a full-authority digital engine controls (FADEC) or other similar device, including electronic engine control (EEC), engine control unit (EUC), and the like.

The methods and systems described herein may be implemented in a high level procedural or object oriented programming or scripting language, or a combination thereof, to communicate with or assist in the operation of a computer system, for example the controller 212. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 902 of the controller 212, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a hybrid electric aircraft propulsion system, the method comprising:
providing a first electric propulsor and a second electric propulsor with a first source of propulsion power from a generator configured for generating a first output of alternating current (AC) electric power, the first source of propulsion power provided to the first electric propulsor and the second electric propulsor through respective first motor stators of the first electric propulsor and the second electric propulsor;
providing the first electric propulsor and the second electric propulsor with a second source of propulsion power independent from the first source of propulsion power, from at least one motor inverter operatively coupled to a direct current (DC) power source, the at least one motor inverter configured to convert the DC electric power from the DC power source into a second output of AC electric power, the second source of propulsion power provided to the first electric propulsor and the second electric propulsor through respective second motor stators of the first electric propulsor and the second electric propulsor;

monitoring a frequency of the first electric propulsor or the second electric propulsor through the motor inverter and detecting desynchronization between a frequency of the generator and the frequency of the first electric propulsor or the second electric propulsor; and modulating the second source of propulsion power applied to a desynchronized one of the first electric propulsor and the second electric propulsor from the at least one motor inverter to synchronize the frequency of the desynchronized one of the first electric propulsor and the second electric propulsor with the frequency of the generator, and maintaining, during the synchronization, a connection between the generator and the desynchronized one of the first electric propulsor and the second electric propulsor.

2. The method of claim 1, further comprising disconnecting the at least one motor inverter from the first electric propulsor to synchronize the frequency of the second electric propulsor with the frequency of the generator, and disconnecting the at least one motor inverter from the second electric propulsor to synchronize the frequency of the first electric propulsor with the frequency of the generator.

3. The method of claim 1, wherein modulating the second source of propulsion power applied to the desynchronized one of the first electric propulsor and the second electric propulsor is performed in response to a command from a controller.

4. The method of claim 1, wherein providing the first electric propulsor and the second electric propulsor with the first source of propulsion power from the generator comprises providing the first electric propulsor with the first source of propulsion power from a first stator of the generator, and providing the second electric propulsor with the first source of propulsion power from a second stator of the generator.

5. The method of claim 1, wherein the at least one motor inverter comprises a first motor inverter operatively coupled to the first electric propulsor and a second motor inverter operatively coupled to the second electric propulsor.

6. A system for operating a hybrid electric aircraft propulsion system comprising:
a processing unit; and
a non-transitory computer readable medium having stored thereon programming instructions executable by a processor for:
providing a first electric propulsor and a second electric propulsor with a first source of propulsion power from a generator configured for generating a first output of alternating current (AC) electric power, the first source of propulsion power provided to the first electric propulsor and the second electric propulsor through respective first motor stators of the first electric propulsor and the second electric propulsor;
providing the first electric propulsor and the second electric propulsor with a second source of propulsion power independent from the first source of propulsion power, from at least one motor inverter operatively coupled to a direct current (DC) power source, the at least one motor inverter configured to convert the DC electric power from the DC power source into a second output of AC electric power, the second source of propulsion power provided to the first electric propulsor and the second electric propulsor through respective second motor stators of the first electric propulsor and the second electric propulsor;
monitoring a frequency of the first electric propulsor or the second electric propulsor through the motor inverter and detecting desynchronization between a frequency of the generator and the frequency of the first electric propulsor or the second electric propulsor; and
modulating the second source of propulsion power applied to a desynchronized one of the first electric propulsor and the second electric propulsor from the at least one motor inverter to synchronize the frequency of the desynchronized one of the first electric propulsor and the second electric propulsor with the frequency of the generator and maintaining, during the synchronization, a connection between the generator and the desynchronized one of the first electric propulsor and the second electric propulsor.

7. The system of claim 6, wherein the programming instructions are further executable for disconnecting the at least one motor inverter from the first electric propulsor to synchronize the frequency of the second electric propulsor with the frequency of the generator, and disconnecting the at least one motor inverter from the second electric propulsor to synchronize the frequency of the first electric propulsor with the frequency of the generator.

8. The system of claim 6, wherein modulating the second source of propulsion power applied to the desynchronized one of the first electric propulsor and the second electric propulsor is performed in response to a command from a controller.

9. The system of claim 6, wherein providing the first electric propulsor and the second electric propulsor with the first source of propulsion power from the generator comprises providing the first electric propulsor with the first source of propulsion power from a first stator of the generator, and providing the second electric propulsor with the first source of propulsion power from a second stator of the generator.

10. The system of claim 6, wherein providing the first electric propulsor and the second electric propulsor with the second source of propulsion power from the at least one motor inverter comprises providing the first electric propulsor with the second source of propulsion power from a first inverter and providing the second electric propulsor with the second source of propulsion power from a second inverter.

11. A hybrid electric aircraft propulsion system, the system comprising:
a thermal engine configured for outputting rotational mechanical power;
a generator configured for generating a first source of alternating current (AC) electric power from the rotational mechanical power;
at least one motor inverter configured to convert DC electric power received from a DC power source to AC electric power to provide a second source of AC electric power independent from the first source of AC electric power;
a first electric propulsor and a second electric propulsor operatively coupled to the generator to receive AC electric power therefrom through respective first motor stators and operatively coupled to the at least one motor inverter to receive AC electric power therefrom, through respective second motor stators; and
a controller configured for monitoring a frequency of the first electric propulsor or the second electric propulsor through the motor inverter and detecting desynchronization between a frequency of the generator and the frequency of the first electric propulsor or the second electric propulsor, and for modulating the AC electric power applied to a desynchronized one of the first electric propulsor and the second electric propulsor from the at least one motor inverter to synchronize the frequency of the desynchronized one of the first electric propulsor and the second electric propulsor with a frequency of the generator, and maintaining, during the synchronization, a connection between the generator and the desynchronized one of the first electric propulsor and the second electric propulsor.

12. The hybrid electric aircraft propulsion system of claim 11, wherein the controller is further configured for disconnecting the at least one motor inverter from the first electric propulsor to synchronize the frequency of the second electric propulsor with the frequency of the generator, and disconnecting the at least one motor inverter from the second electric propulsor to synchronize the frequency of the first electric propulsor with the frequency of the generator.

13. The hybrid electric aircraft propulsion system of claim 11, wherein the generator comprises a first stator for providing the first source of AC electric power to the first electric propulsor and a second stator for providing the first source of AC electric power to the second electric propulsor.

14. The hybrid electric aircraft propulsion system of claim 11, wherein the at least one motor inverter comprises a first motor inverter operatively coupled to the first electric propulsor and a second motor inverter operatively coupled to the second electric propulsor.

* * * * *